United States Patent [19]
Rankin, Jr.

[11] 3,796,395
[45] Mar. 12, 1974

[54] BAIT CASTING FISHING REEL

[76] Inventor: Marvin L. Rankin, Jr., 3909 Wedgeway Dr., Fort Worth, Tex. 76133

[22] Filed: Dec. 13, 1972

[21] Appl. No.: 314,692

Related U.S. Application Data

[63] Continuation of Ser. No. 73,748, Sept. 21, 1970, abandoned.

[52] U.S. Cl. .......................... 242/212, 242/84.5 R
[51] Int. Cl. ............................................. A01k 89/02
[58] Field of Search ........... 242/211, 212, 213, 214, 242/216, 217, 220, 219, 84.5 R, 84.51 R

[56] References Cited
UNITED STATES PATENTS

| | | | |
|---|---|---|---|
| 3,104,850 | 9/1963 | Wood | 242/212 |
| 2,536,583 | 1/1951 | Tank | 242/216 |
| 2,478,111 | 8/1949 | Kilian | 242/84.51 R |
| 3,171,609 | 3/1965 | Baenziger | 242/216 |
| 3,167,272 | 1/1965 | Frode | 242/213 |
| 2,643,131 | 6/1953 | King | 242/217 |
| 2,263,836 | 11/1941 | Balz et al. | 242/216 |
| 2,129,386 | 9/1938 | Schafer | 242/219 |

Primary Examiner—Billy S. Taylor
Attorney, Agent, or Firm—Peter J. Murphy; Cecil L. Wood

[57] ABSTRACT

A spool-type fishing reel is provided with a positive drive mechanism between the spool and the crank handle including a positive acting clutch which selectively disengages the spool from the drive mechanism for free spooling and is disengaged by a lever positioned to be engaged by the thumb of the angler during casting, and upon release conditions the clutch to be engaged upon line payout. An adjustable drag mechanism acts on the direct drive mechanism to retard spool rotation on line payout, when the clutch is engaged.

9 Claims, 15 Drawing Figures

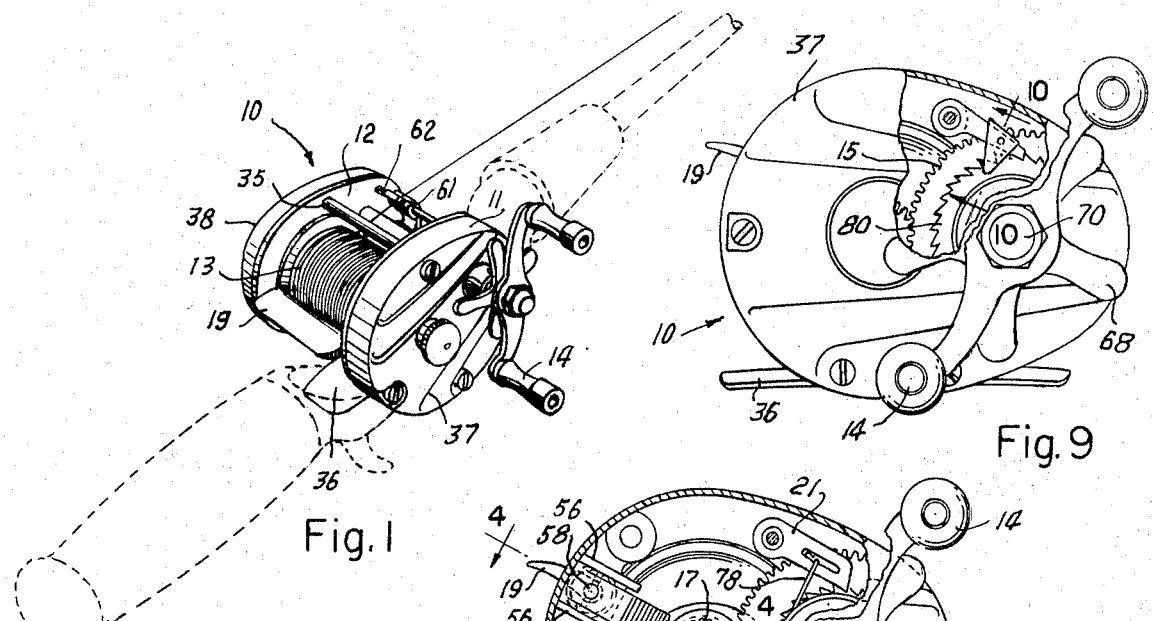
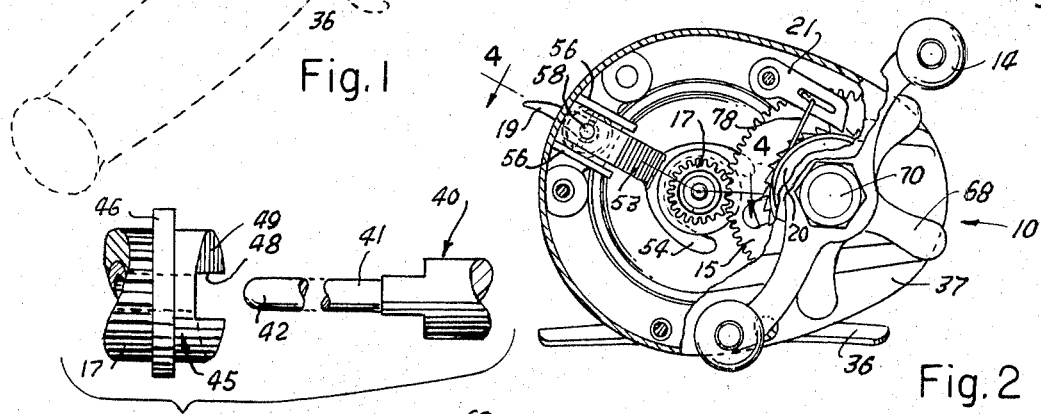
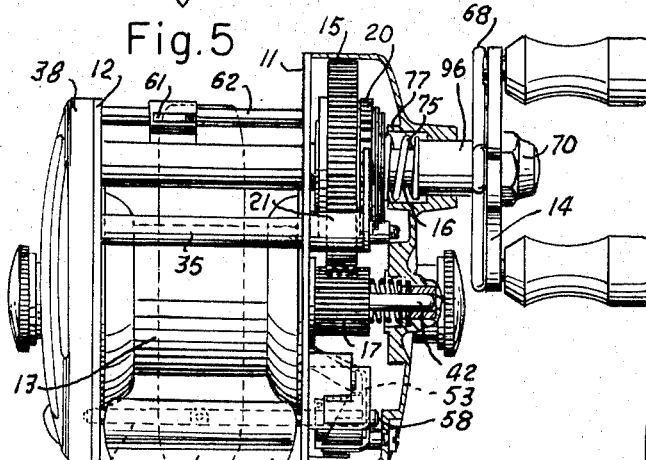
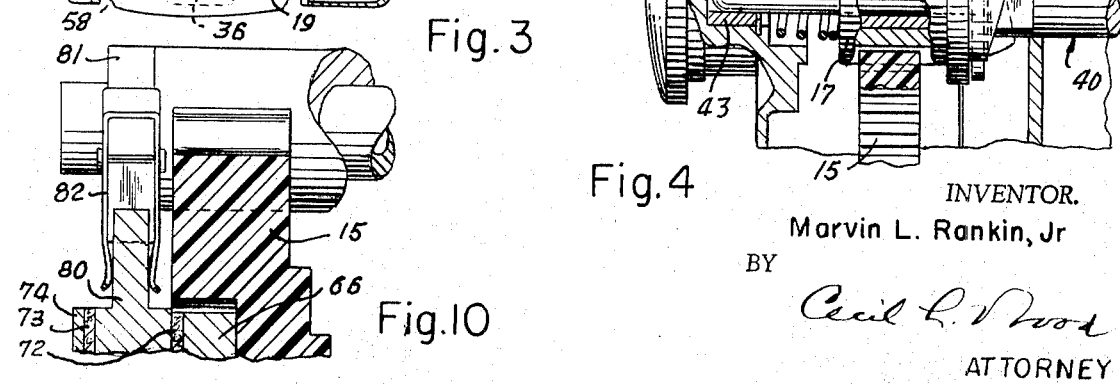
INVENTOR.
Marvin L. Rankin, Jr

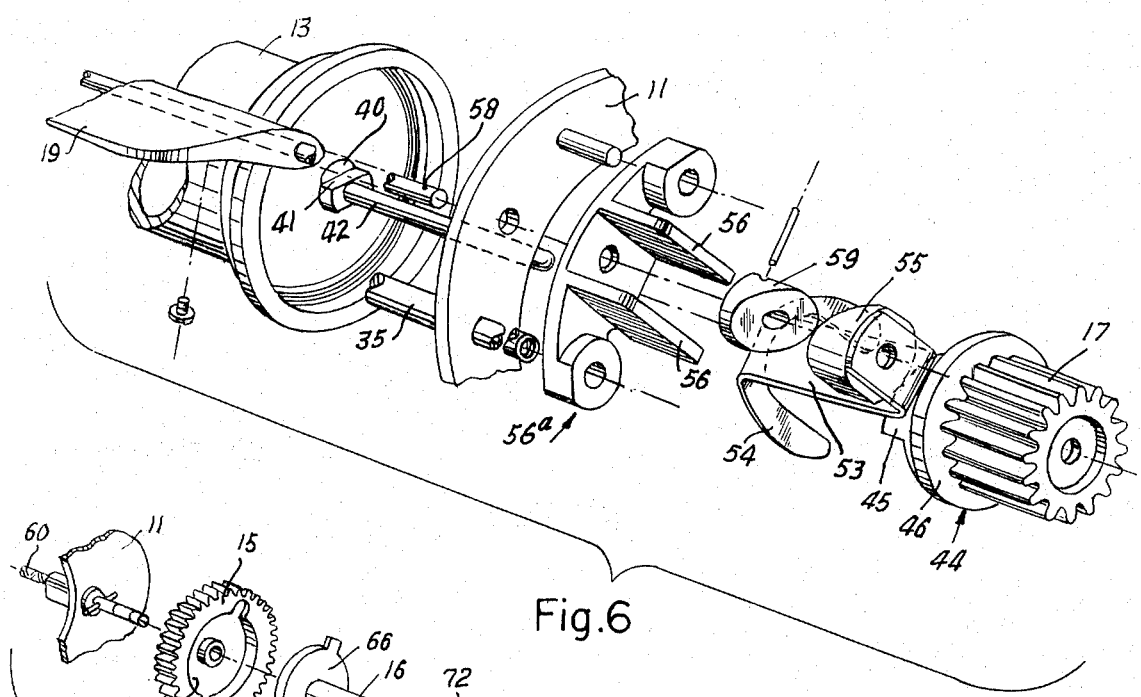
Fig.6
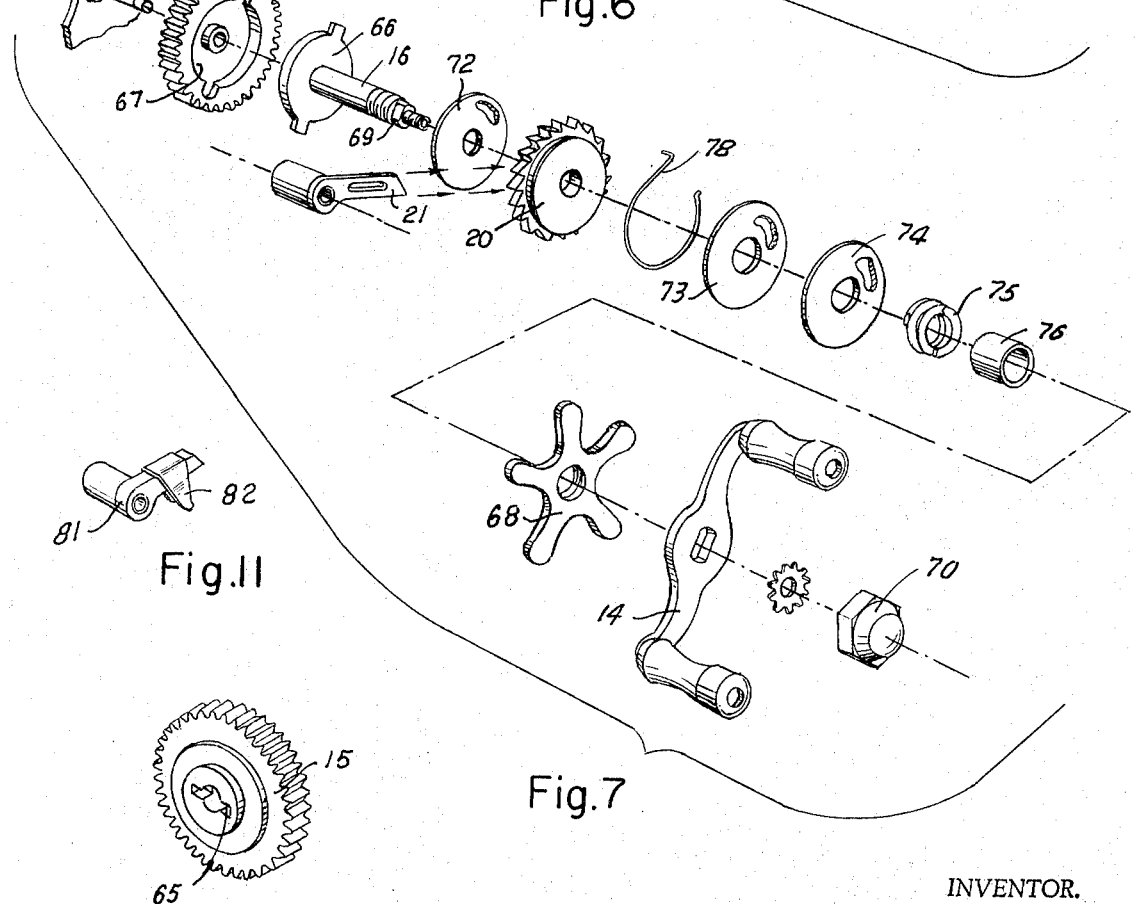
Fig.7
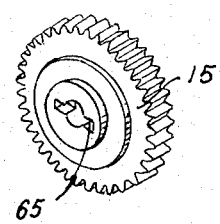
Fig.11
Fig.8
INVENTOR.
Marvin L. Rankin, Jr.
BY
ATTORNEY

PATENTED MAR 12 1974 3,796,395

INVENTOR.
Marvin L. Rankin, Jr.
BY
Cecil L. Wood
ATTORNEY

BAIT CASTING FISHING REEL

This is a continuation of application Ser. No. 73,748, filed Sept. 21, 1970, and now abandoned.

BACKGROUND AND SUMMARY OF THE INVENTION

This invention relates to control mechanisms for bait casting fishing reels.

One problem which faces users of bait casting reels is the occurrence of a backlash, particularly at an inopportune tine, and it is desirable therefore that various controls which are provided on bait casting reels serve to assist the angler in preventing backlash.

One form of control device assists in preventing backlash, as well as for other purposes, is an adjustable drag control for varying the resistance to line payout as the spool is rotated during the playing of the fish. In one type of adjustable drag mechanism, referred to as a conventional star drag, the drive mechanism between the crank handle and the spool is a friction drive with means for varying the friction to increase or decrease the drag as desired With this type of drive and drag mechanism there is no direct or positive drive between the crank handle and the spool and, while this is desirable for certain types of fishing, it is preferred for other types of fishing to have a direct or positive acting drive between the crank handle and spool as an additional measure of control.

For example, the fresh water fisherman prefers a positive drive for positively reeling in the fish, and also the ability to positively stop line payout to abruptly stop a fish in the water for better control. This type of control is not available with a reel having a friction drive. Along with these controls, the fresh water fisherman prefers to have the advantage of an adjustable mechanical drag on the drive mechanism to obviate the backlash problem. This feature is not available on known direct drive reels, and the fresh water fisherman who uses a salt water reel to obtain this advantage, loses the control advantage of the positive drive.

An object of this invention is to obviate the disadvantages of known reel control mechanisms by providing improved control mechanisms.

Another object of this invention is to provide improved control mechanisms for a bait casting reel for obviating backlash.

Still another object of this invention is to provide a bait casting reel having a positive drive between the crank handle and spool and including an adjustable drag effective upon withdrawing of line from the spool.

For accomplishing these objects, a bait casting fishing reel, according to the invention, includes a positive drive mechanism for driving the spool and an associated adjustable drag mechanism for improved control of a reel having a positive acting free spooling release clutch to release the spool from the drive mechanism for casting.

The novel features and the advantages of the invention, as well as additional objects thereof, will be understood more fully from the following description when read in connection with the accompanying drawings.

DRAWINGS

FIG. 1 is a perspective view of a bait casting reel according to the invention as mounted on a rod shown in broken lines.

FIG. 2 is a view from the head side of the reel of FIG. 1 with a portion of the head cover broken away.

FIG. 3 is a view from the top of the reel as seen in FIG. 1 with a portion of the head cover broken away to show the drive mechanism.

FIG. 4 is a fragmentary sectional view illustrating the free spooling release mechanism.

FIG. 5 is a fragmentary detail view of elements of the free spooling clutch mechanism.

FIG. 6 is an exploded view of the elements and parts of the free spooling release mechanism.

FIG. 7 is an exploded view of the elements and parts of the positive drive and drag mechanism according to one embodiment of the invention.

FIG. 8 is a detail view of the drive gear shown in FIG. 7.

FIG. 9 is a view from the head side of the reel of FIG. 1 with the head cover partially broken away to show an alternative form of ratchet pawl assembly for the drag mechanism.

FIG. 10 is a fragmentary view of the ratchet pawl assembly of FIG. 9.

FIG. 11 is a detail view of the pawl of FIGS. 9 and 10.

DESCRIPTION OF THE PREFERRED EMBODIMENTS

Figure 13:
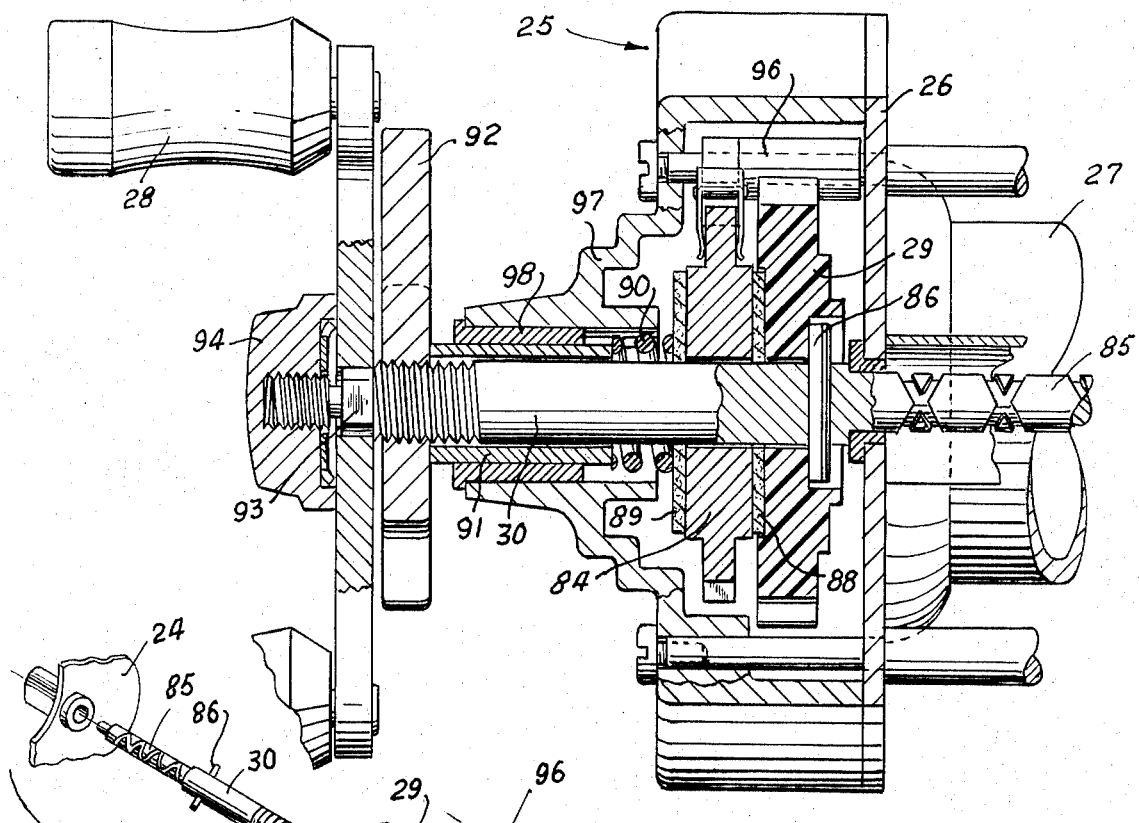
FIG. 13 is a fragmentary view of the reel of FIG. 12 as viewed from the front with the head cover broken away showing details of the positive drive and drag assembly.

FIGS. 1 through 11 illustrate one form of bait casting fishing reel 10 including a housing defined by a head plate 11 and a tail plate 12 spaced by suitable spacer bars and having a spool 13 rotatably supported between the head and tail plates. The spool is rotated through a positive drive mechanism including a crank handle 14 and a drive gear 15 coupled by a drive shaft 16, and the spool pinion 17 driven by the drive gear, with the spool pinion being coupled to the spool through a positive engaging, free spooling release clutch. A control bar 19 pivotally mounted between the head and tail plates controls the positive engaging clutch. An adjustable drag mechanism includes a ratchet wheel 20 and pawl 21, with the ratchet wheel coacting with friction elements nonrotatably mounted on the drive shaft to retard rotation of the positive drive mechanism.

FIGS. 12 through 15 illustrate another form of bait casting reel 25 of generally similar configuration, with only the head plate 26 being shown. A spool 27 rotatably supported between the head and tail plates is rotated by a positive drive mechanism including a crank handle 28 and drive gear 29 coupled by a drive shaft 30 which includes an integral carriage screw for the level wind mechanism, and a spool pinion 31 which is coupled to the spool through a positive acting free spooling release clutch operated by a control bar 32.

EMBODIMENT OF FIGS. 1 THROUGH 11

Referring now in detail to the reel of FIGS. 1 through 11, the housing for the reel 10 includes head and tail plates 11 and 12 respectively which are assembled in spaced relation through several spacer bars 34 and 35. A tongue 36 is secured to the lower spacer bars by means of which the reel is secured to a fishing rod in a well-known manner. The head and tail plates have respective covers 37 and 38 which serve to enclose and protect operating parts mounted on the plates, and are decorative as well.

The spool 13 includes end flanges which are received within suitable openings in the head and tail plates, and the spool is nonrotatably fixed to a spool shaft 40 which is rotatably supported in suitable bearings in the respective plate covers 37 and 38. As best seen in FIG. 4, the spool shaft includes a larger diameter portion which extends through the spool and is provided at the head end with diametrically opposed flats or flat surfaces defining a clutch tang 41. A smaller diameter shaft extension 42 extends to a supporting bushing 43 in the head cover 37.

A clutch assembly 44 whch includes the spool pinion 17 and a clutch member 45 spaced by an intervening washer defining a collar 46, is supported for rotation and for limited axial shifting on the shaft extension 42. The clutch member includes confronting axially extending bosses defining a transverse groove 48, dimensioned to receive the clutch tang 41, and axially facing cam surfaces 49 which engage the axially facing surface of the tang during clutch engagement to guide the tang gradually into the clutch slot, this to insure positive and immediate clutch engagement when the spool is rotated through withdrawal of line.

As best seen in FIG. 4, the clutch assembly 44 is normally urged by a coil spring 52 to the clutch engaged position wherein the tang 41 is received in the clutch groove 48. The clutch is disengaged by shifting the clutch assembly 44 to the left as viewed in FIG. 4 against the force of the spring 52, and this shifting is effected by a lift bar 53 having a fork 54 which receives the clutch member 45 and is positioned under the clutch collar 46. The end of the lift bar 53 remote from the fork 54 has mounted thereon a cam member 55 provided with opposing flat surfaces which engage and are guided within a groove defined by parallel wall members 56 secured to the head plate 11. The coacting cam member 55 and wall members 56 provide for reciprocating movement of the lift bar 53 in a direction parallel to the spool axis.

For shifting the lift bar 53, the control bar 19 is an elongated flat member having a pivot shaft 58 extending longitudinally therethrough adjacent to one edge to be pivotally anchored in the head and tail plates. As best seen in FIGS. 3 and 6 the shaft 58, at the head plate end, extends between the wall members 56 and has a cam member 59 nonrotatably fixed thereto. The cam member 55 is provided with an axial bore which receives the end of the shaft 58 so that the cam members 59 and 55 are axially aligned. These cam members are provided with mating faces disposed in a transverse plane inclined relative to the shaft 58 and being disposed to lie contiguous to each other when the free spooling release clutch is engaged. When the control bar 19 is rotated, in a manner to be described, the cam member 59 is rotated relative to the cam member 55 to effect axial separation of the cam members, and the lift bar 53 is shifted axially, with its associated cam member 55, to effect the lifting of the clutch assembly 44 to disengage the free spooling release clutch.

As best seen in FIGS. 1 and 2, the control bar 19 is positioned on the reel to be conveniently operated by the thumb of the angler during casting. That is, when the angler grips the rod and positions his thumb to brake the spool in a normal manner, the thumb is also positioned to depress the control bar 19 toward the rod to release the spool for total free spooling. At the end of the cast, when the bait strikes the water, the angler has normally braked the spool with his thumb. Then, upon releasing the control bar 19, he free spooling clutch may be immediately re-engaed under the force of the spring 52, should the clutch tang 41 and clutch groove 48 be appropriately aligned. Should these members not be aligned, the clutch cam surfaces 48 will be urged against the tang 41 in a manner that rotation of the spool and tang, through withdrawal of line for example, will immediately engage the free spooling release clutch.

A conventional level wind mechanism for the reel 10 includes a shaft 60 mounted for rotation in suitable bearings in the head and tail plates about an axis parallel to the spool axis, the shaft 60 defining a level wind worm gear between the head and tail plates. A level wind guide 61 driven by the level wind worm gear traverses the reel between the head and tail plates being guided on a guide bar 62. The shaft 60 extends through the head plate 11 to provide a support for the drive gear 15 and the drive shaft 16.

The shaft 60 is provided with a transverse pin 64 extending through the shaft adjacent to the outer face of the head plate 11, and the drive gear, as best seen in FIG. 8, is provided with a transverse groove 65 to accommodate the pin 64 when the gear is assembled on the shaft 60. In this manner, the drive gear 15 is mounted on the shaft for rotation therewith. The drive shaft 16 has an eared washer 66 mounted at its inner end which is received in a suitable recess 67 in the drive gear, as best seen in FIG. 7, whereby the drive shaft is nonrotatably coupled to the drive gear. The drive shaft is also provided with an axial bore to receive the extension of the shaft 60 to maintain the shafts 16 and 60 in axial alignment.

The drive shaft 16 is of a length to extend from the head plate 11 through the head cover 37, and includes a larger diameter shank portion threaded at its outer end to accommodate an internally threaded star wheel 68. A planar tang 69 is provided adjacent to the outer end of the larger diameter portion to be received in a planar oval opening in the crank handle 14 whereby the drive shaft is driven by the crank handle. The outer reduced diameter end of the drive shaft is threaded to accommodate a nut 70 and associated lock washer to retain the crank handle on the shaft. With this mechanism, rotation of the crank handle by the angler directly drives the spool 13 and the level wind worm gear in the shaft 60.

An adjustable drag mechanism for the reel 10 includes the following elements which are assembled on the drive shaft 16 in juxtaposed relation from the eared washer 66 toward the outer end of the shaft, each of the elements having an internal diameter slightly larger than the diameter of the shaft shank portion. These elements are a first friction washer 72 formed of a fiber material such as asbestos, for example, the ratchet wheel 20, a second friction washer 73 identical to the washer 72, a metallic backing washer 74, a helical spring 75 and a sleeve 76.

In assembled relation, as best seen in FIG. 3, the sleeve 76 passes through a bearing opening in the head cover 37, and is received within this opening in relatively close fitting relation to define a bushing for the outer end of the drive shaft 16, and the sleeve is also axially slidable relative to the head cover as will be seen. These parts are retained on the drive shaft 16 by the star wheel 68 which is threaded onto the outer end of the shaft 16. Again, as best seen in FIG. 3, the washers 72 and 73, the ratchet wheel 20 and the backing washer 74 are urged by the spring 75 toward the eared washer 66, and the force axially compressing these parts is adjustable through rotation of the star wheel 20 relative to the shaft. A boss 77 integral with the head cover 37 defines an inward facing shoulder for limiting outward movement of this assembly.

A pawl 21 includes an integral sleeve shank which is pivotally supported on a transverse pivot pin on the head plate to be engaged or disengaged with the peripheral teeth of the ratchet wheel 20. As best seen in FIGS. 2 and 7, a C-shaped spring is retained on the ratchet wheel in frictional relation within a suitable annular groove so that the spring will tend to rotate with the ratchet wheel, and this spring has an axially directed finger at one end which is received within a longitudinal slot in the pawl 21. With this arrangement, when the ratchet wheel is rotated in one direction (counterclockwise in FIG. 2) the spring rotates the pawl into engagement with the ratchet wheel teeth, and when the ratchet wheel is rotated in the other (clockwise) direction the pawl is disengaed from the teeth.

In operation, when the crank handle is operated to retrieve line, the pawl is disengaged from the ratchet wheel. Conversely, when line is being withdrawn from the spool and the drive mechanism is operated in a reverse direction, the rotation of the ratchet wheel brings the pawl into engagement to lock the ratchet wheel against rotations, and the frictional force applied to the drag washers 72 and 73 through the spring and star wheel 68 provide an adjustable drag for the spool drive mechanism.

FIGS. 9, 10 and 11 illustrate an alternative form of ratchet and pawl assembly for performing the above-described functions. In this form, a ratchet wheel 80 is substantially identical in configuration to the above-described ratchet wheel 20, but without the annular groove means necessary to support a C-shaped spring 78. A pawl 81 for engagement with the ratchet wheel 80 includes an elongated arm and a transverse sleeve shank for pivotally mounting the pawl on an appropriate journal pin, and the U-shaped plate spring 82 is fixed to the pawl arm defining parallel tines which extend radially inwardly relative to the ratchet wheel and are urged toward each other to bear against opposing faces of the ratchet wheel.

In this manner, the pawl is frictionally engaged with the ratchet wheel in a manner such that when the wheel is rotated in one direction (counterclockwise in FIG. 9) the frictional drag between the pawl spring and ratchet wheel urges the pawl into engaagement with the peripheral ratchet teeth, while rotation of the ratchet wheel in the opposite (clockwise) direction urges the pawl out of engagement with the ratchet teeth. This arrangement operates the same as that previously described in that when the spool is rotated through withdrawal of line, the pawl is urged into engagement with a ratchet wheel to lock the wheel against rotation whereby the adjustable drag is effective to retard rotation of the spool.

OPERATION

In the operation of the reel, with the line retrieved the bait is cast in the usual manner. The angler grips the rod of the handle and his thumb is positioned adjacent to the spool so as to be ready to manually brake the spool when the bait strikes the water surface to prevent backlash. The control bar 19 is positioned so that when the angler has his thumb in the above-mentioned position to brake the spool, it rests on the bar depressing it downwardly toward the rod thereby effecting the lifting of the clutch assembly 44 to disengage the free spooling release clutch so that the spool 13 is completely free of a driving mechanism.

As soon as the spool is braked, the angler shifts his hand to grasp the handle with one hand while operating the crank handle with the other to retrieve the line. As soon as the operating bar 19 is released through removal of thumb pressure the free spooling clutch is engaged under the force of the spring 52. Should the clutch groove 48 be aligned with the tang 41 at the moment of releasing the bar 19, the clutch will immediately re-engage. If these members are not aligned, the cam surfaces of the clutch member 45 will engage the tang, and upon relative rotation of the clutch member 45 and spool shaft 40 the clutch will engage under the urging of the spring.

Should a fish strike the bait immediately upon striking the water surface, or before the angler grasps the crank handle, the rotation of the spool caused by withdrawal of line will rotate the spool shaft relative to the clutch member 45 to bring these parts into clutch engaging alignment, and the clutch parts will be eased into positive engagement through the riding of the tang along the sloping cam surfaces 49. If the bait is not struck by a fish, rotation of the crank handle will cause the same relative rotation of the clutch member and spool shaft 40 to effect the gradual and positive engagement of the clutch.

Following clutch engagement, during rotation of the spool by crank, the pawl is urged by the associated pawl spring out of engagement with the ratchet wheel, whereby the ratchet wheel rotates with the drive shaft to provide for free line retrieval through the direct drive mechanism. Should a fish strike the bait during line retrieval, withdrawal of the line from the spool will effect reverse rotation of the direct drive mechanism bringing the pawl into engagement with the ratchet wheel teeth to provide the drag on the drive mechanism in accordance with the star wheel adjustment. Because of the direct drive mechanism, the crank handle will be rotated in reverse during line withdrawal.

If desired, the angler may stop line withdrawal by grasping the crank handle to prevent its rotation, stop the spool rotation through the mechanical advantage provided through the direct drive mechanism. When the fish stops running, line is again retrieved in the usual manner.

EMBODIMENT OF FIGS. 12 THROUGH 15

FIGS. 12 through 15 illustrate the reel 25, according to the invention which is generally similar in structure and operation, but which has a modified form of drive mechanism. The reel 25 is provided with a free spooling clutch mechanism having the same configuration as that already described and being operated by a control bar 32.

Figure 14:
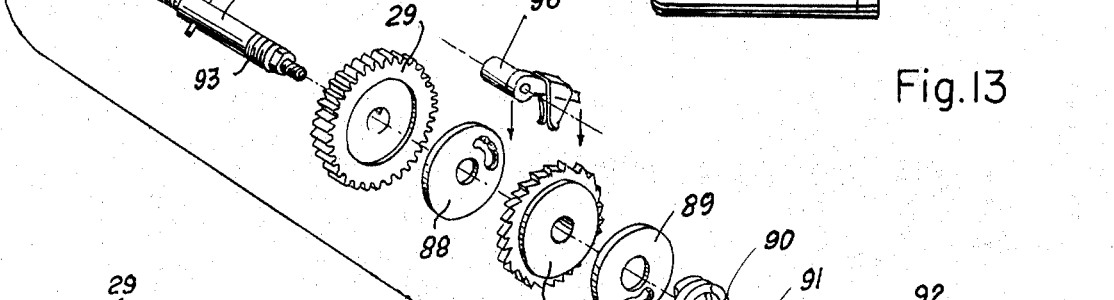
FIG. 14 is an exploded view of the elements and parts of the positive drive and drag assembly.
Figure 15:
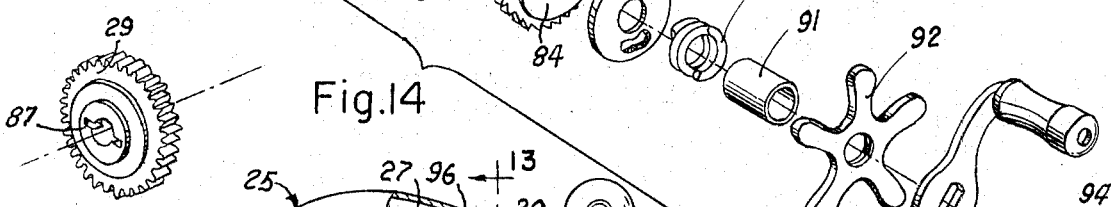
FIG. 15 is a detail view of the drive gear of FIG. 14.
Figure 12:
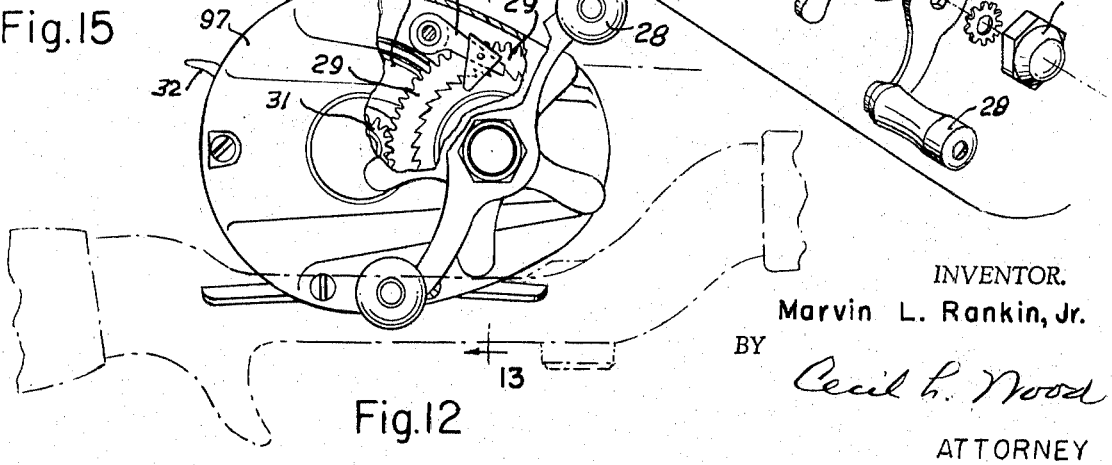
FIG. 12 is a view from the head side of an alternative form of bait casting reel according to the invention, mounted on a rod as indicated on broken lines.

As best seen in FIGS. 13 and 14, the drive shaft 30 is integral with the level wind worm gear, with the worm gear portion 85 extending between the head and tail plates being supported in suitable bearings or bushings in these plates. The shaft 30 is again provided with a transverse pin 86, just outside the head plate 26, to be received in a transverse groove 87 in the drive gear 29 whereby the gear is rotationally coupled to the shaft in the manner of the previously described assembly.

The parts for the drag assembly are similar to those previously described and include a first drag washer 88, a ratchet wheel 84, a second drag water washer 89, a helical spring 90 and a sleeve 91, all having an internal diameter to be closely supported on the drive shaft 30. These parts are retained on the drive shaft by a star wheel 92 which is threaded onto the drive shaft in the manner described to provide an adjustable frictional force acting on the ratchet wheel 80. In this arrangement, the parts are compressed between the drive gear 29 and the star wheel 92. The drive shaft 30 is provided with a planar tang 93 to be received in the oval opening in the crank handle 28 to couple the crank handle to the shaft in nonrotatable relation. The crank handle is retained on the shaft by an acorn nut 94 threaded onto the reduced diameter threaded end portion of the drive shaft.

The ratchet wheel is controlled in the manner already described through a pawl 96 having the same configuration as the previously described pawl 81.

In assembled relation, as best seen in FIG. 13, the sleeve 91 passes through an opening in the head cover 97 and is supported in a bushing 98 received in the head cover opening. The sleeve 91 then slides axially within the bushing 98 to provide the tension adjustment for the adjustable drag control, and the sleeve rotates within the bushing 98 for rotational support of the outer end of the drive assembly.

The operation of the reel in FIGS. 12 through 15 is identical to that of the reel 10 of FIGS. 1 through 11.

What has been described are bait casting fishing reels having improved controls providing control functions not available in conventional reels of this type.

A particular feature and advantage of a reel according to the invention is the combination of a positive drive for the spool and an adjustable drag control. For fresh water fishing, particularly where the fishing waters contain obstructions around which the fish may entangle the line, it is desirable to be able to abruptly stop the fish in the water and this can only be done with a positive drive. When the fish is taking line, the crank handle in the reel according to the invention, is rotating in a reverse direction, and the angler may positively stop line payou by simply grasping the handle and, through the mechanical advantage provided by the drive mechanism, prevent spool rotation. Additionally, the angler can positively reel in the fish when this is desired.

While these are features of known fresh water reels, the combination of the adjustable drag mechanism provides additional advantages. Should a fish strike the bait during line retrieval with such force that the angler loses the crank handle, the drag feature will prevent a backlash at a most opportune time. During the playing of the fish, the angler can use the combination of the adjustable drag mechanism with manual thumb braking to control the running of the fish, while having the advantage of the control to abruptly stop the fish if desired and to positively reel it in through the positive drive mechanism.

What is claimed is:

1. A bait casting fishing reel comprising
a spool; a positive drive mechanism for said spool including a spool pinion, a drive gear for driving said pinion, a crank handle, and a drive shaft coupling said crank handle and said drive gear; said positive drive mechanism positively coupling said spool pinion and said crank handle at all times;
adjustable drag means associated with said positive drive mechanism for retarding rotation of said spool and said drive mechanism when operated by payout of line from said spool;
said adjustable drag means including disc means axially and nonrotatably fixed on said drive shaft defining a first transverse bearing face, a ratchet wheel rotatably mounted on said drive shaft having a second bearing face confronting said first bearing face, resilient means on said shaft for urging said ratchet wheel toward said disc means, star wheel means adjustably mounted on said shaft for selectively and variably compressing said resilient means; and pawl means on said reel for engagement with said ratchet wheel to permit rotation of said ratchet wheel with said drive shaft and disk means in only one direction to effect the reeling in of line.

2. A fishing reel as set forth in claim 1
wherein said reel includes a level wind worm gear for operating a level wind line guide; and means coupling said level wind worm gear, said drive gear and said drive shaft in axially aligned nonrotatable relation as a unitary assembly.

3. A fishing reel as set forth in claim 2
wherein said level wind worm gear is defined by an integral extension of said drive shaft.

4. A fishing reel as set forth in claim 1
wherein said drive gear is axially and nonrotatably mounted on said drive shaft; and wherein said drive gear defines said first bearing face.

5. A fishing reel as set forth in claim 1
wherein said ratchet wheel defines oppositely facing bearing faces; a pair of drag washers rotatably mounted on said shaft, disposed contiguous to the opposite bearing faces of said ratchet wheel; and said resilient means comprising a helical spring disposed on said drive shaft for urging said ratchet wheel and said drag washers toward said disc means bearing face.

6. A fishing reel as set forth in claim 5
wherein said reel includes head and tail plates, said spool being rotatably mounted between said head and tail plates;

a head cover defining an enclosure for said head plate; said spool drive mechanism being enclosed within said head cover;

said head cover providing an opening for said drive shaft; a sleeve member disposed on said shaft between said helical spring and said star wheel means, said sleeve member defining a bushing for the outer end of said drive shaft assembly.

7. A fishing reel as set forth in claim 1 wherein said disc means is a disc member integral with said drive shaft, defining said first bearing face.

8. A fishing reel as set forth in claim 1 selectively disengageable positive acting clutch means operative between said spool and said pinion to release said spool from said drive mechanism for free spooling thereof.

9. A bait casting fishing reel comprising a spool; a drive mechanism for said spool including a spool pinion, a drive gear for driving said pinion, a crank handle, and a drive shaft coupling said crank handle and said drive gear;

adjustable drag means associated with said drive mechanism for retarding rotation of said spool and said drive mechanism when operated by payout of line from said spool;

said adjustable drag means including disc means axially and nonrotatably fixed on said drive shaft defining a first transverse bearing face; a ratchet wheel rotatably mounted on said drive shaft having a second bearing face confronting said first bearing face; resilient means on said shaft for urging said ratchet wheel toward said disc means, star wheel means adjustably mounted on said shaft for selectively and variably compressing said resilient means; and pawl means on said reel for engagement with said ratchet wheel to permit rotation of said ratchet wheel with said drive shaft and disc means in only one direction to effect the reeling in of line.

* * * * *